(12) United States Patent
Sakka

(10) Patent No.: US 8,874,141 B2
(45) Date of Patent: Oct. 28, 2014

(54) PROVISION OF INFORMATION

(75) Inventor: Noriyuki Sakka, Tokyo (JP)

(73) Assignee: Nec Biglobe, Ltd., Tokyo (JP)

( * ) Notice: Subject to any disclaimer, the term of this patent is extended or adjusted under 35 U.S.C. 154(b) by 238 days.

(21) Appl. No.: 13/034,919

(22) Filed: Feb. 25, 2011

(65) Prior Publication Data

US 2011/0223938 A1 Sep. 15, 2011

(30) Foreign Application Priority Data

Mar. 11, 2010 (JP) .................................. 2010-054422

(51) Int. Cl.
*H04W 24/00* (2009.01)
*H04W 4/02* (2009.01)
*H04W 4/18* (2009.01)

(52) U.S. Cl.
CPC *H04W 4/02* (2013.01); *H04W 4/18* (2013.01); *H04W 4/026* (2013.01)
USPC ...................................................... 455/456.3

(58) Field of Classification Search
USPC ............ 455/404.2, 412.1, 414.2, 456.1
See application file for complete search history.

(56) References Cited

U.S. PATENT DOCUMENTS

2008/0161018 A1 * 7/2008 Miller et al. ............... 455/456.3

FOREIGN PATENT DOCUMENTS

| JP | 10-304433 A | 11/1998 |
| JP | 10-318772 A | 12/1998 |
| JP | 2002238070 A | 8/2002 |
| JP | 2007133463 A | 5/2007 |
| JP | 2009080662 A | 4/2009 |

OTHER PUBLICATIONS

Japanese Office Action for JP2010-054422 issued Mar. 13, 2012.
Japanese Office Action for JP Application No. 2012-105878 mailed on Jul. 9, 2013 with Partial English Translation.

* cited by examiner

*Primary Examiner* — Kwasi Karikari
(74) *Attorney, Agent, or Firm* — Sughrue Mion, PLLC

(57) ABSTRACT

An information providing server acquires, according to a relative position of a mobile terminal to an information source which is a base of provided information transmitted to the mobile terminal, preset provided information among a plurality of pieces of provided information stored in a provided information database, and transmits the acquired provided information to the mobile terminal. The mobile terminal displays the received provided information.

18 Claims, 16 Drawing Sheets

Fig.3

| information name (information source) | information source location information | bearing range | provided information identification information |
|---|---|---|---|
| store A | north latitude: ○○° ○○′ ○○″ east longitude: △△° △△′ △△″ | equal to or more than 90 to less than 270 | floor information of south building http://a-ten/floor_s.htm |
| | | equal to or more than 0 to less than 90 or equal to or more than 270 to less than 360 | floor information of north building http://a-ten/floor_n.htm |
| store B | north latitude: □□° □□′ □□″ east longitude: ××° ××′ ××″ | equal to or more than 0 to less than 180 | advertisement of company P http://b-ten/ad/p.htm |
| | | equal to or more than 180 to less than 360 | advertisement of company Q http://b-ten/ad/q.htm |
| ... | ... | ... | ... |

Fig.8

| information name (information source) | information source location information | bearing range | distance range | provided information identification information |
|---|---|---|---|---|
| store A | north latitude:○○° ○○' ○○" east longitude:△△° △△' △△" | equal to or more than 90 to less than 270 | less than 1 kilometer | floor information of south building http://a-ten/floor_s.htm |
| | | | equal to or more than 1 kilometer | map information of south building http://a-ten/route_s.htm |
| | | equal to or more than 0 to less than 90 or equal to or more than 270 to less than 360 | less than 1 kilometer | floor information of north building http://a-ten/floor_n.htm |
| | | | equal to or more than 1 kilometer | map information of north building http://a-ten/route_n.htm |
| store B | north latitude:□□° □□' □□" east longitude:××° ××' ××" | equal to or more than 0 to less than 180 | less than 5 kilometer | advertisement of company P http://b-ten/ad/p.htm |
| | | | equal to or more than 5 kilometer | advertisement of company R http://b-ten/ad/r.htm |
| | | equal to or more than 180 to less than 360 | less than 5 kilometer | advertisement of company Q http://b-ten/ad/q.htm |
| | | | equal to or more than 5 kilometer | advertisement of company S http://b-ten/ad/s.htm |
| ... | ... | ... | ... | ... |

Fig. 11

| information name (information source) | information source location information | bearing range | height difference range | provided information identification information |
|---|---|---|---|---|
| store A | north latitude:○○° ○○′ △△″<br>east longitude:△△° △△′ △△″ | equal to or more than 90 to less than 270 | less than 10 meters | floor information of south building<br>http://a-ten/floor_s.htm |
| | | | equal to or more than 10 meters | イベント情報<br>http://a-ten/event.htm |
| | | equal to or more than 270 to or equal to or more than 360 | less than 10 meters | floor information of north building<br>http://a-ten/floor_n.htm |
| | | | equal to or more than 10 meters | イベント情報<br>http://a-ten/event.htm |
| | | equal to or more than 0 to less than 180 | less than 10 meters | advertisement of company P<br>http://b-ten/ad/p.htm |
| | | | equal to or more than 10 meters | advertisement of company T<br>http://b-ten/ad/t.htm |
| store B | north latitude:□□° □□′ ××″<br>east longitude:×× ××′ ××″ | equal to or more than 180 to less than 360 | less than 10 meters | advertisement of company Q<br>http://b-ten/ad/q.htm |
| | | | equal to or more than 10 meters | advertisement of company U<br>http://b-ten/ad/u.htm |
| ... | ... | ... | ... | ... |

PROVISION OF INFORMATION

PROVISION OF INFORMATION

This application is based upon and claims the benefit of priority from Japanese Patent Application No. 2010-054422 filed on Mar. 11, 2010, the content of which is incorporated by reference.

TECHNICAL FIELD

The present invention relates to an information providing system, an information providing server, an information providing method, and a program for providing information.

BACKGROUND ART

In recent years, in the case of providing information to a mobile terminal, services for providing information according to a location of the mobile terminal have become widespread.

A technology for providing information according to not only the location of the mobile terminal but also an orientation of the mobile terminal (direction which the mobile terminal faces) has also been developed (e.g., refer to Patent Literature 1).

CITATION LIST

Patent Literature

[Patent Literature 1] JP2009-080662A

SUMMARY OF INVENTION

Technical Problem

However, in the abovementioned technology, only a search range for searching for information to be distributed changes according to the direction which the mobile terminal faces. Unique information is provided concerning information content of an information source. Thus, even when the information source has much information, information suited to the situation of a viewer who is the owner of a mobile terminal may not be provided. In such a case, a problem may arise in which a loss of necessary information occurs.

It is an object of the present invention to provide an information providing system, an information providing server, an information providing method, and a program which can solve the abovementioned problem.

Solution to Problem

An information providing system according to one aspect of the present invention includes a provided information database for storing a plurality of pieces of provided information, a mobile terminal, and an information providing server for transmitting the provided information to the mobile terminal. The information providing server acquires, according to the relative position of the mobile terminal to an information source which is a base of the provided information, preset provided information from the plurality of pieces of provided information stored in the provided information database, and transmits the acquired provided information to the mobile terminal. The mobile terminal displays the provided information received from the information providing server.

An information providing server connected to a provided information database for storing a plurality of pieces of provided information and configured to transmit the provided information to a mobile terminal, according to another aspect of the present invention, includes an associated information storage unit for associating information source location information indicating a location of an information source which is a base of the provided information, relative position information indicating a relative position of the mobile terminal to the location indicated by the information source location information, and provided information identification information added to each of the pieces of provided information to identify the plurality of pieces of provided information with one another, and then storing the information, a search unit for searching for the provided information identification information in the associated information storage unit based on the relative position information indicating the relative position of the mobile terminal, an acquisition unit for acquiring the provided information to which the provided information identification information retrieved by the search unit has been added from the provided information database, and a communication unit for transmitting the provided information acquired by the acquisition unit to the mobile terminal.

An information providing method for transmitting provided information to a mobile terminal according to a still another aspect of the present invention, includes a step of calculating a relative position of the mobile terminal to an information source which is a base of the provided information, a step of searching for, based on relative position information indicating the calculated relative position, provided information identification information in associated information associating the relative position information and the provided information identification information added to the provided information to identify the provided information beforehand, a step of acquiring the provided information to which the retrieved provided information identification information has been added from a provided information database for storing the provided information, and a step of transmitting the acquired provided information to the mobile terminal.

A recording medium for storing a program is provided according to still another aspect of the present invention. The program causes an information providing server for transmitting provided information to a mobile terminal to execute a step of calculating a relative position of the mobile terminal to an information source which is a base of the provided information, a step of searching for, based on relative position information indicating the calculated relative position, provided information identification information in associated information associating the relative position information and the provided information identification information added to the provided information to identify the provided information beforehand, a step of acquiring the provided information to which the retrieved provided information identification information has been added from a provided information database for storing the provided information, and a step of transmitting the acquired provided information to the mobile terminal.

Advantageous Effects of Invention

As described above, according to the present invention, information suited to the situation of the viewer can be provided.

The above and other objects, features, and advantages of the present invention will become apparent from the following description with reference to the accompanying drawings which illustrate an example of the present invention.

BRIEF DESCRIPTION OF DRAWINGS

FIG. 3 shows a first example of associated information stored in an associated information storage unit shown in FIG. 2.

FIG. 8 shows a second example of associated information stored in the associated information storage unit shown in FIG. 2.

FIG. 11 shows a third example of associated information stored in the associated information storage unit shown in FIG. 2.

DESCRIPTION OF EMBODIMENTS

Hereinafter, embodiments of the present invention are described with reference to the drawings.

Figure 1:
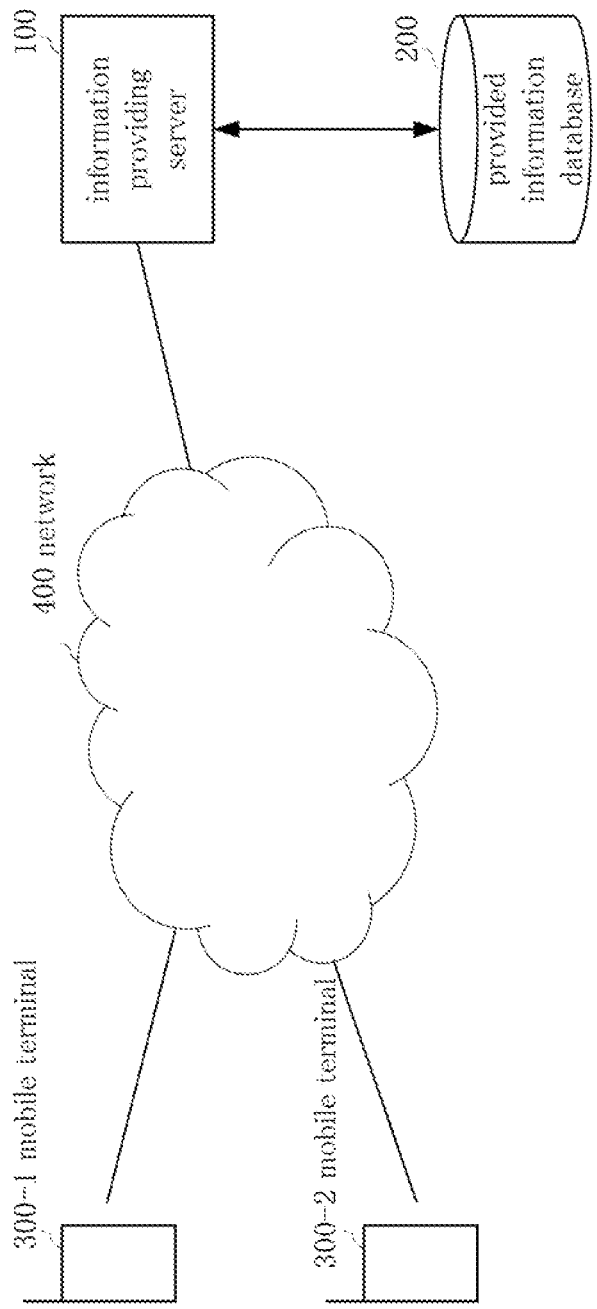
FIG. 1 shows an information providing system according to an embodiment of the present invention.

As shown in FIG. 1, an information providing system according to an embodiment includes information providing server 100, provided information database 200, mobile terminals 300-1 and 300-2, and network 400. The embodiment shown in FIG. 1 is described by taking an example where there are two mobile terminals. However, there are no restrictions on the number of mobile terminals.

Provided information database 200 stores a plurality of pieces of information to be provided to mobile terminals 300-1 and 300-2. Provided information database 200 can be disposed in each of the following locations—a store, a station and facilities which act as base for provided information. In other words, provided information database 200 can be physically divided into a plurality of databases and installed in a plurality of places. Provided information database 200 can physically be one database. Provided information database 200 can be configured in any manner as long as it is accessible to information providing server 100. An information source is a distribution base of such provided information. When the information source is store A, the provided information is information to prompt general users to use store A or information to introduce store A. For example, the provided information may be floor information of store A, an advertisement of commodities sold at store A, information on events scheduled to be held at store A, or information to be acquired by using store A and so on.

Mobile terminals 300-1 and 300-2 are portable terminals which have wireless communication functions. Mobile terminals 300-1 and 300-2 acquire location information (terminal location information) indicating current locations of mobile terminals 300-1 and 300-2. This location information can be acquired by using a Global Positioning System (GPS). It suffices that the location information is acquired from information provided from a communication base station such as a portable terminal (including potable telephone) which performs wireless communication or is acquired from estimated information based on the reception status from a wireless Local Area Network (LAN) base station. Mobile terminals 300-1 and 300-2 transmit the acquired terminal location information to information providing server 100. Mobile terminals 300-1 and 300-2 display menu information or the provided information transmitted from information providing server 100. To display such information, displays generally included in mobile terminals 300-1 and 300-2 can be used. Information input according to the displayed menu information is transmitted to information providing server 100. Mobile terminals 300-1 and 300-2 can include electronic compasses. In this case, orientations (directions) of mobile terminals 300-1 and 300-2 can be acquired, and direction information indicating the orientations (directions) can be transmitted together with the terminal location information to information providing server 100. Thus, information providing server 100 can recognize the direction from which mobile terminals 300-1 and 300-2 acquire information.

Network 400 is a general communication network. Network 400 interconnects information providing server 100 and mobile terminals 300-1 and 300-2.

Information providing server 100 receives the terminal location information or the direction information transmitted from mobile terminals 300-1 and 300-2. Information providing server 100 acquires preset provided information from among the plurality of pieces of provided information stored in provided information database 200 according to a relative position which is a location indicated by the terminal location information with respect to a location of the information source. Information providing server 100 transmits the acquired provided information to mobile terminals 300-1 and 300-2.

Figure 2:
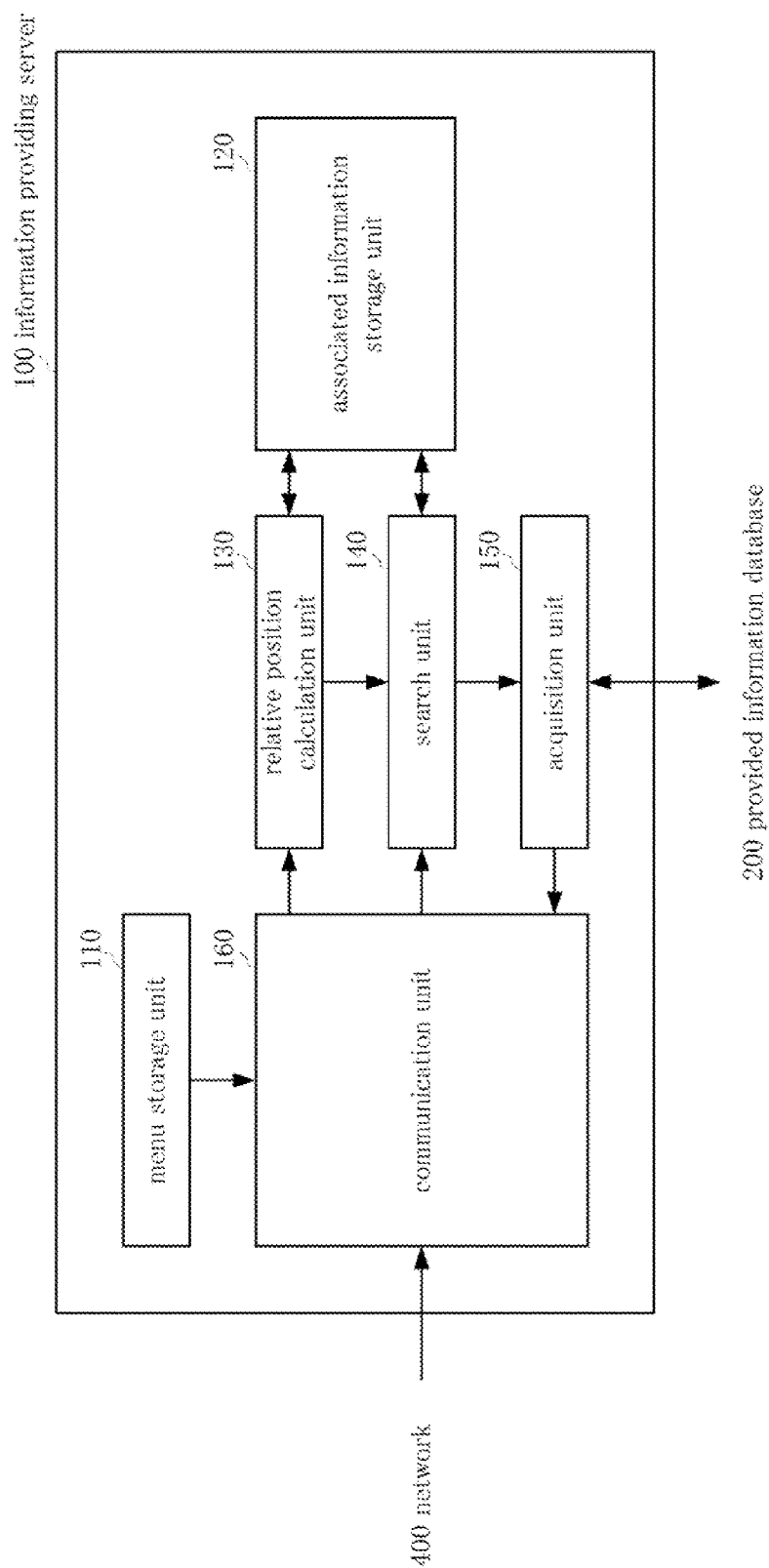
FIG. 2 shows an example of an internal configuration of an information providing server shown in FIG. 1.

Information providing server 100 shown in FIG. 1 includes, as shown in FIG. 2, menu storage unit 110, associated information storage unit 120, relative position calculation unit 130, search unit 140, acquisition unit 150, and communication unit 160. FIG. 2 shows only those pertinent to the present invention from among components which constitute information providing server 100.

Menu storage unit 110 stores menu information to display a menu screen used by operators of mobile terminals 300-1 and 300-2 for selecting desired information sources from among a plurality of information sources. The menu information is preset.

Associated information storage unit 120 associates information source location information, relative position information, and provided information identification information with one another, and then stores the information. The information source location information indicates a location of an information source. The relative position information indicates a relative position which is a location indicated by the terminal location information transmitted from mobile terminals 300-1 and 300-2 with respect to the location indicated by the information source location information. The provided information identification information is added beforehand to each piece of provided information to identify each of the plurality of pieces of provided information stored in provided information database 200.

Associated information storage unit 120 can be configured to associate and store, for each piece of the plurality of information sources, a plurality of information names indicating the plurality of information sources, the information source location information, the relative position information, and the provided information identification information. Associated information storage unit 120 can store, as the provided information identification information, storage area information indicating a storage area of pertinent provided information in provided information database 200. Associated information storage unit 120 can store, as the relative position information, a bearing of the location indicated by terminal location information transmitted from mobile terminals 300-1 and 300-2 with respect to the location of the information source.

Associated information storage unit 120 shown in FIG. 2 stores, as shown in FIG. 3, information names, information source location information, bearing ranges, and provided information identification information that are all associated with each other. The bearing range is relative position information indicating a relative position with respect to a location of an information source.

For example, as shown in FIG. 3, an information name "store A", information source location information "north latitude: ○○°○'○○"", east longitude: ΔΔ°ΔΔ'ΔΔ""", a bearing range "equal to or more than 90° to less than 270°", and provided information identification information "floor information of south building, http://a-ten/floor_s.htm" are associated with one another to be stored as associated information. This associated information indicates that provided information identification information of provided information transmitted to a mobile terminal located within a range where a relative position (bearing) with respect to the store A located at "north latitude: ○○°○'○○"", east longitude: ΔΔ°ΔΔ'ΔΔ""" is "equal to or more than 90° to less than 270°" is "floor information of south building, http://a-ten/floor_s.htm". The bearing range is "equal to or more than 90° to less than 270°". However, this angle reference only needs to be unified in the system, and there are no particular restrictions. For example, in the bearing range shown in FIG. 3, angles are set clockwise with a true north set to 0° (reference) as a relative position to an information source. In this case, angles are 90° when a relative position is a true east, 180° when a relative position is a true south, and 270° when a relative position is a true west.

Figure 4:
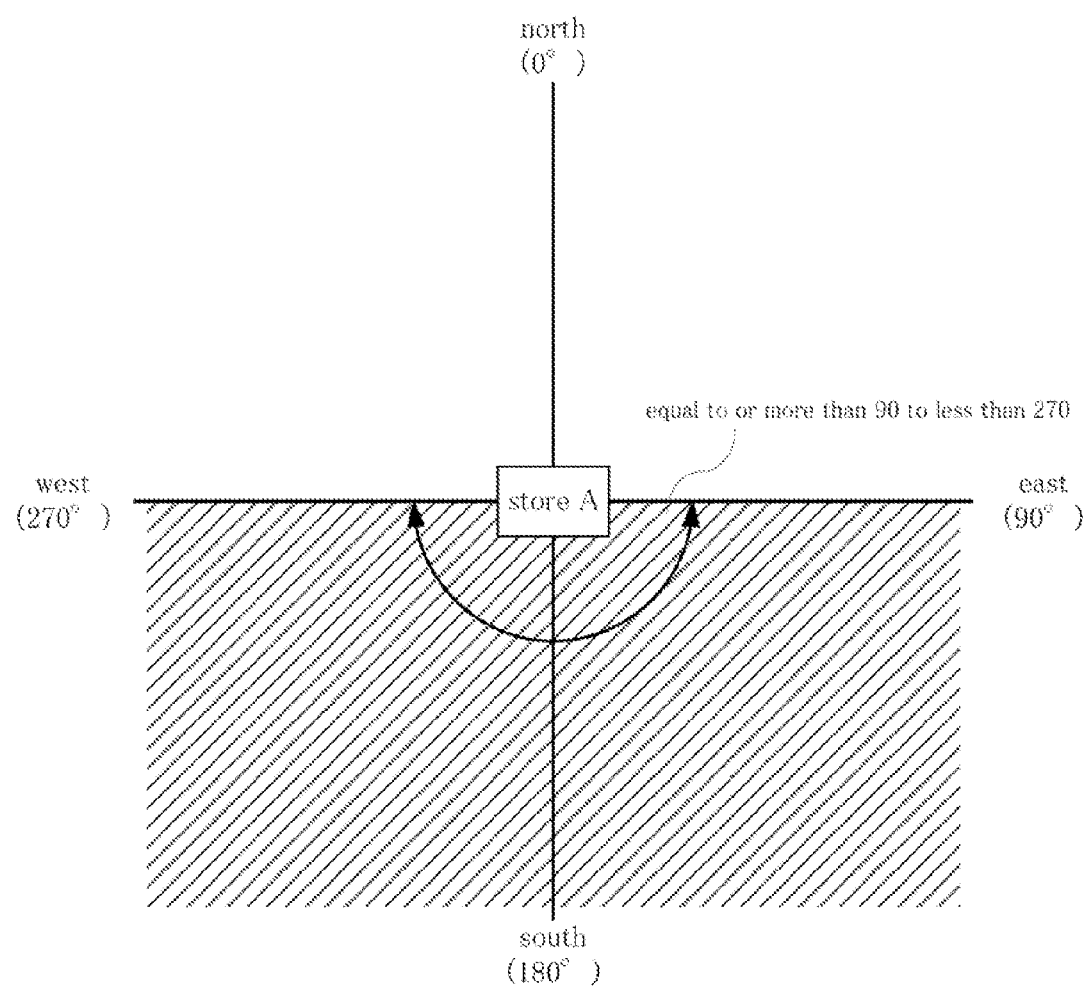
FIG. 4 is a diagram illustrating a relative position "equal to or more than 90° to less than 270°'" with respect to a store A.

As shown in FIG. 4, angles are set clockwise around store A with a true north set to 0°. The bearing range "equal to or more than 90° to less than 270°" is accordingly a range indicated by hatched lines.

Figure 5:
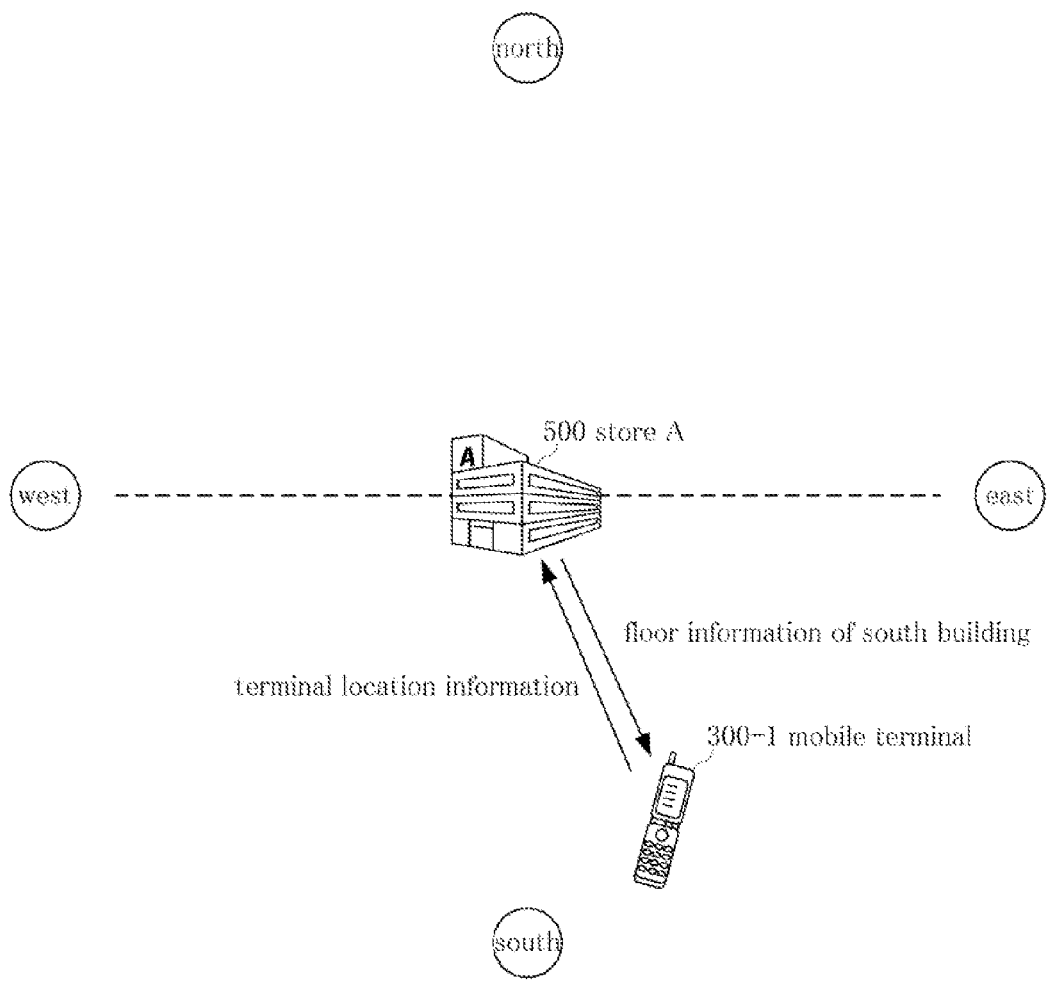
FIG. 5 shows an image of information exchange between a mobile terminal and store A when the mobile terminal is located within a shaded range shown in FIG. 4.

As shown in FIG. 5, in a case where mobile terminal 300-1 is located within a range of angles equal to or more than 90° to less than 270° with respect to store A 500, when terminal location information of mobile terminal 300-1 is transmitted from mobile terminal 300-1, the floor information of the south building is transmitted to mobile terminal 300-1 based on the associated information shown in FIG. 3. FIG. 5 shows information exchange between mobile terminal 300-1 and store A 500. This illustration is for easier understanding. Actual signal transmission and reception are performed between mobile terminal 300-1 and information providing server 100.

As shown in FIG. 3, an information name "store A", information source location information "north latitude: ○○°○'○○"", east longitude: ΔΔ°ΔΔ'ΔΔ""", a bearing range "equal to or more than 0° to less than 90° or equal to or more than 270° to less than 360°", and provided information identification information "floor information of north building, http://a-ten/floor_n.htm" are associated with one another to be stored as associated information. This associated information indicates that provided information identification information of provided information transmitted to a mobile terminal located within a range where a relative position (bearing) with respect to store A located at "north latitude: ○○°○'○○"", east longitude: ΔΔ°ΔΔ'ΔΔ""" is "equal to or more than 0° to less than 90° or equal to or more than 270° to less than 360°" is "floor information of north building, http://a-ten/floor_n.htm".

Figure 6:
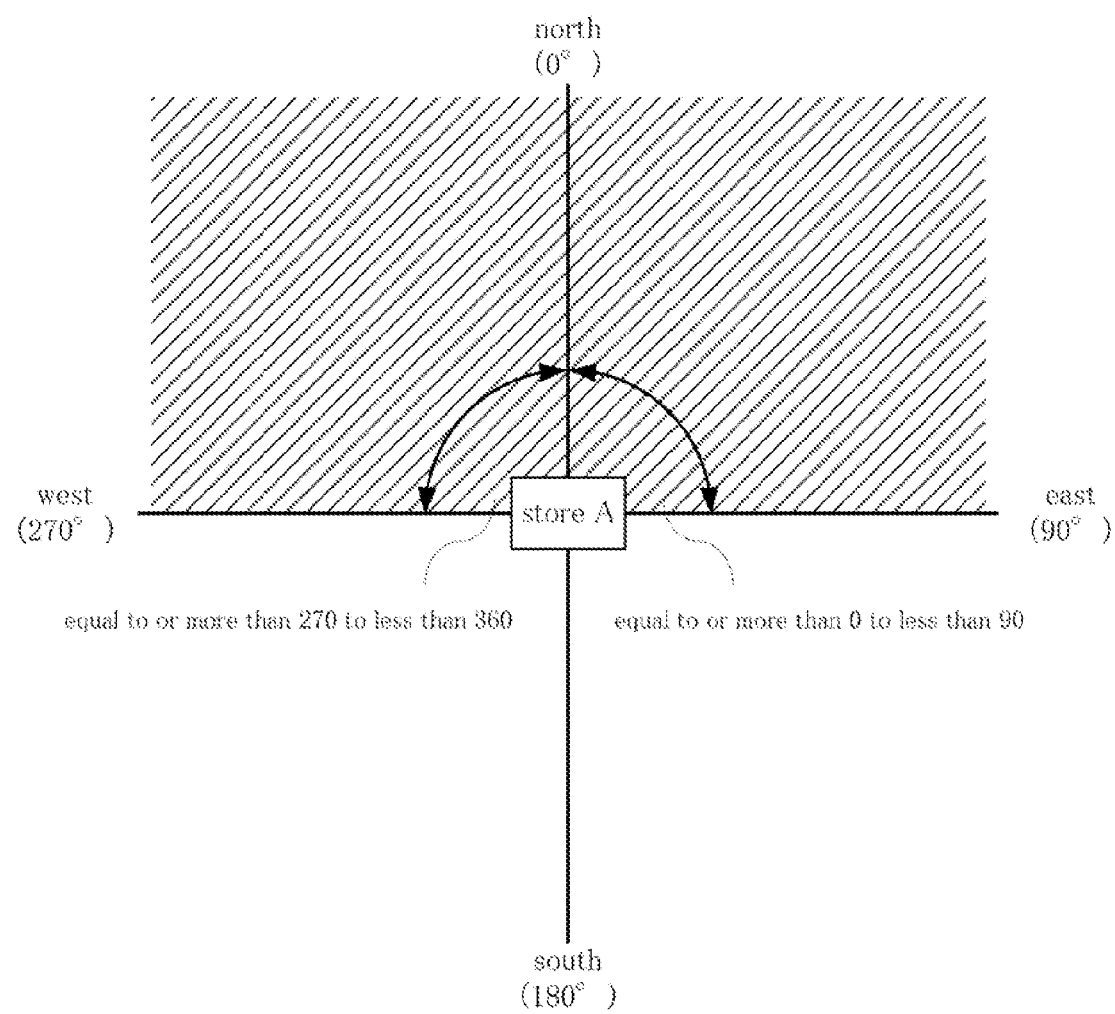
FIG. 6 is a diagram illustrating a relative position "equal to or more than 0° to less than 90° or equal to or more than 270° to less than 360°'" with respect to store A.

As shown in FIG. 6, angles are set clockwise around the store A with a true north set to 0°. The bearing range "equal to or more than 0° to less than 90° or equal to or more than 270° to less than 360°" is accordingly a range indicated by hatched lines.

Figure 7:
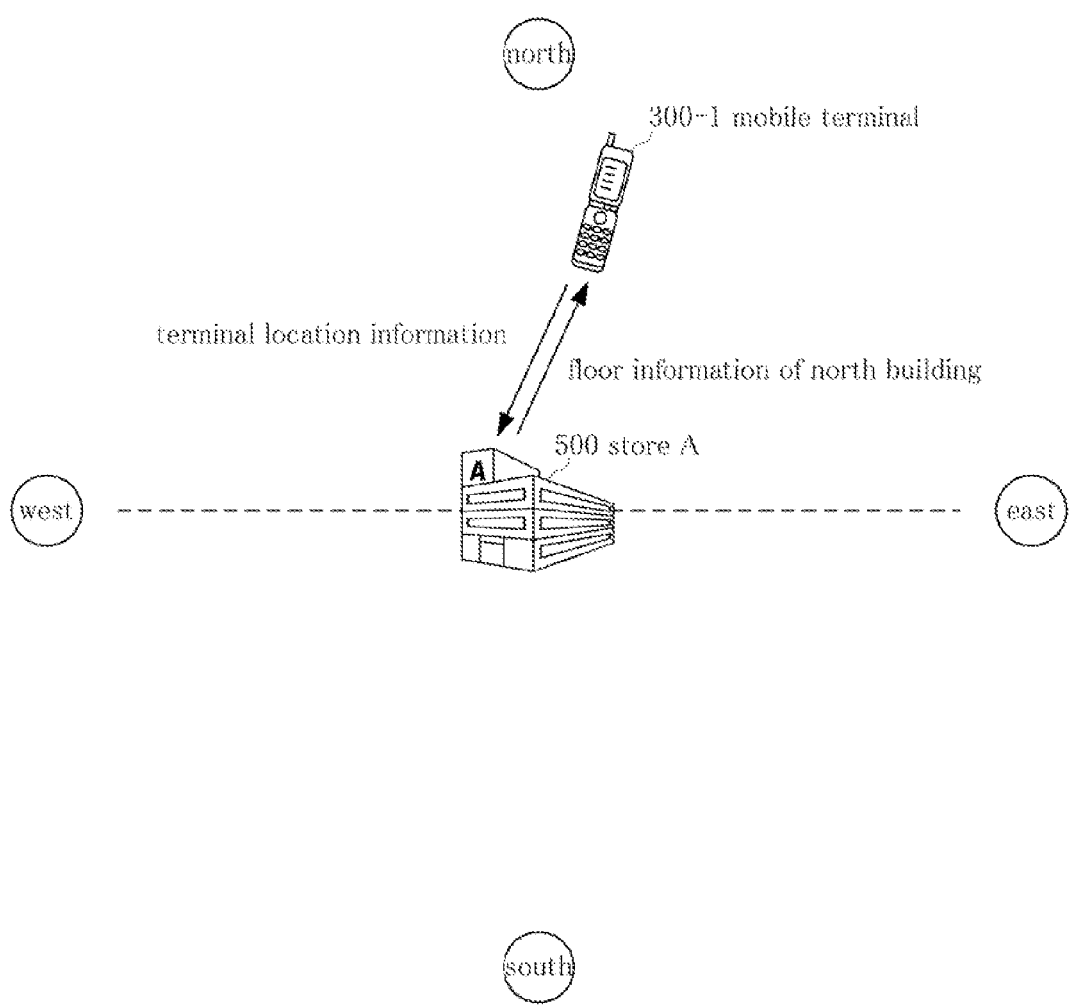
FIG. 7 shows an image of information exchange between the mobile terminal and store A when the mobile terminal is located within a shaded range shown in FIG. 6.

As shown in FIG. 7, in a case where mobile terminal 300-1 is located within a range of angles equal to or more than 0° to less than 90° or equal to or more than 270° to less than 360° with respect to store A 500, when terminal location information of mobile terminal 300-1 is transmitted from mobile terminal 300-1, the floor information of the north building is transmitted to mobile terminal 300-1 based on the associated information shown in FIG. 3. FIG. 7 shows information exchange between mobile terminal 300-1 and store A 500. This illustration is for easier understanding. Actual signal transmission and reception are performed between mobile terminal 300-1 and information providing server 100.

As shown in FIG. 3, an information name "store B", information source location information "north latitude: □□°□□'□□"", east longitude: XX°XX'XX""", a bearing range "equal to or more than 0° to less than 180°", and provided information identification information "advertisement of company P, http://b-ten/ad/p.htm" are associated with one another to be stored as associated information. This associated information indicates that provided information identification information of provided information transmitted to a mobile terminal located within a range where a relative position (bearing) with respect to store B located at "north latitude: □□°□□'□□"", east longitude: XX°XX'XX""" is "equal to or more than 0° to less than 180°" is "advertisement of company P, http://b-ten/ad/p.htm".

As shown in FIG. 3, an information name "store B", information source location information "north latitude: □□°□□'□□"", east longitude: XX°XX'XX""", a bearing range "equal to or more than 180° to less than 360°", and provided information identification information "advertisement of company Q, http://b-ten/ad/q.htm" are associated with one another to be stored as associated information. This associated information indicates that provided information identification information of provided information transmitted to a mobile terminal located within a range where a relative position (bearing) with respect to store B located at "north latitude: □□°□□'□□"", east longitude: XX°XX'XX""" is "equal to or more than 180° to less than 360°" is "advertisement of company Q, http://b-ten/ad/q.htm".

Associated information storage unit 120 shown in FIG. 2 can store, as the relative position information, a bearing of the location indicated by the terminal location information transmitted from mobile terminals 300-1 and 300-2 with respect to the location of the information source, and the distance from the information source to mobile terminals 300-1 and 300-2.

Associated information storage unit 120 shown in FIG. 2 stores, as shown in FIG. 8, information names, information source location information, bearing ranges, distance ranges, and provided information identification information that are all associated with each other. The bearing range is relative position information indicating a relative position with respect to the location of an information source. The distance range is information indicating the distance from an information source. In other words, the baring range and the distance range are stored as relative position information.

For example, as shown in FIG. 8, an information name "store A", information source location information "north latitude: ○○°○○'○○"", east longitude: ΔΔ°ΔΔ'ΔΔ""", a bearing range "equal to or more than 90° to less than 270°", a distance range "less than 1 kilometer", and provided information identification information "floor information of south building, http://a-ten/floor_s.htm" are associated with one another to be stored as associated information. This associated information indicates that provided information identification information of provided information transmitted to a mobile terminal located within a range where a relative position (bearing) with respect to store A located at "north latitude: ○○°○○'○○"", east longitude: ΔΔ°ΔΔ'ΔΔ""" is "equal to or more than 90° to less than 270°" and at a distance of less than 1 kilometer from an information source is "floor information of south building, http://a-ten/floor_s.htm". A reference of the bearing range is similar to that described above with reference to FIG. 3.

Figure 9:
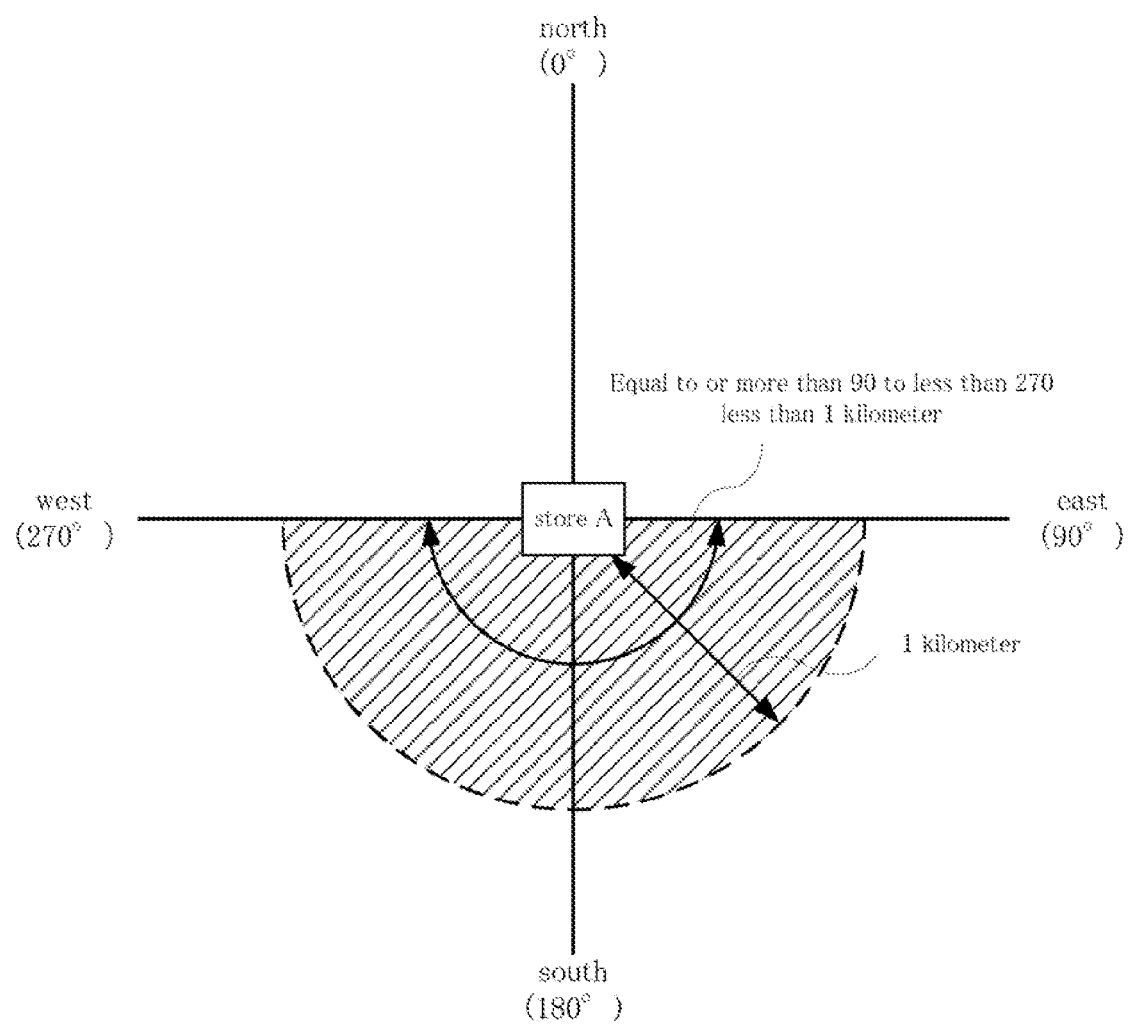
FIG. 9 is a diagram illustrating a relative position "equal to or more than 90° to less than 270°, less than 1 kilometer" with respect to store A.

As shown in FIG. 9, a range where angles of "equal to or more than 90° to less than 270°" are set clockwise around store A which is an information source with a true north set to 0°, and where distances from the point A are less than 1 kilometer is a range indicated by hatched lines.

As shown in FIG. 8, an information name "store A", information source location information "north latitude: ○○°○○'○○"", east longitude: ΔΔ°ΔΔ'ΔΔ""", a bearing range "equal to or more than 90° to less than 270°", a distance range "equal to or more than 1 kilometer", and provided information identification information "map information of south building, http://a-ten/route_s.htm" are associated with one another to be stored as associated information. This associated information indicates that provided information identification information of provided information transmitted to a mobile terminal located within a range where a relative position (bearing) with respect to store A located at "north latitude: ○○°○○'○○"", east longitude: ΔΔ°ΔΔ'ΔΔ""" is "equal to or more than 90° to less than 270°" and at a distance equal to or more than 1 kilometer from an information source is "map information of south building, http://a-ten/route_s.htm".

Figure 10:
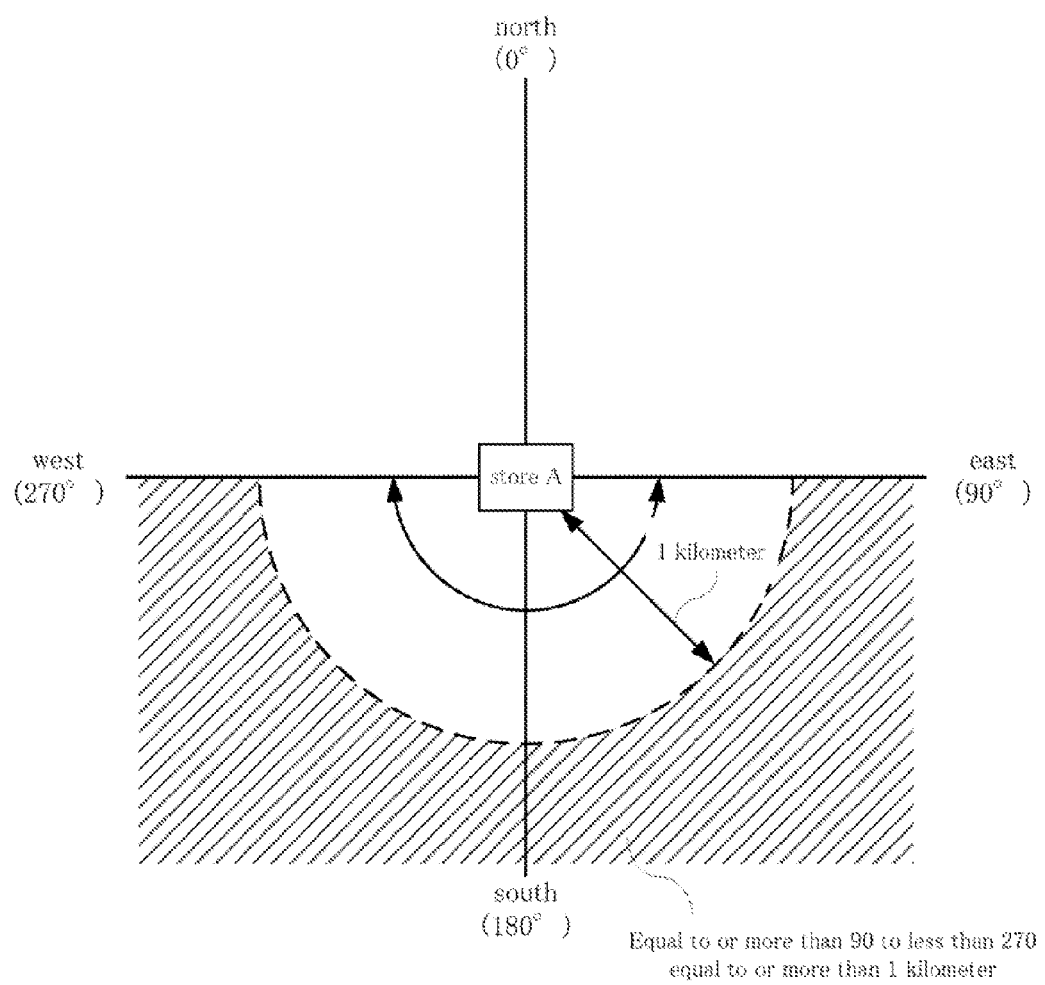
FIG. 10 is a diagram illustrating a relative position "equal to or more than 90° to less than 270°, equal to or more than 1 kilometer" with respect to store A.

As shown in FIG. 10, a range where angles of equal to or more than 90° to less than 270° are set clockwise around store A with a true north set to 0°, and where distances from the point A are equal to or more than 1 kilometer is a range indicated by hatched lines.

As shown in FIG. 8, an information name "store A", information source location information "north latitude: ○○°○○'○○"", east longitude: ΔΔ°ΔΔ'ΔΔ""", a bearing range "equal to or more than 0° to less than 90° or equal to or more than 270° to less than 360°", a distance range "less than 1 kilometer", and provided information identification information "floor information of north building, http://a-ten/floor_n.htm" are associated with one another to be stored as associated information. This associated information indicates that provided information identification information of provided information transmitted to a mobile terminal located within a range where a relative position (bearing) with respect to store A located at "north latitude: ○○°○○'○○"", east longitude: ΔΔ°ΔΔ'ΔΔ""" is "equal to or more than 0° to less than 90° or equal to or more than 270° to less than 360°" and at a distance of less than 1 kilometer from an information source is "floor information of north building, http://a-ten/floor_n.htm".

As shown in FIG. 8, an information name "store A", information source location information "north latitude: ○○°○○'○○"", east longitude: ΔΔ°ΔΔ'ΔΔ""", a bearing range "equal to or more than 0° to less than 90° or equal to or more than 270° to less than 360°", a distance range "equal to or more than 1 kilometer", and provided information identification information "map information of north building, http://a-ten/route_n.htm" are associated with one another to be stored as associated information. This associated information indicates that provided information identification information of provided information transmitted to a mobile terminal located within a range where the relative position (bearing) with respect to store A located at "north latitude: ○○°○○'○○"", east longitude: ΔΔ°ΔΔ'ΔΔ""" is "equal to or more than 0° to less than 90° or equal to or more than 270° to less than 360°" and at a distance that is equal to or more than 1 kilometer from an information source is "map information of north building, http://a-ten/route_n.htm".

As shown in FIG. 8, an information name "store B", information source location information "north latitude: □□°□□'□□"", east longitude: XX°XX'XX""", a bearing range "equal to or more than 0° to less than 180°", a distance range "less than 5 kilometers", and provided information identification information "advertisement of company P, http://b-ten/ad/p.htm" are associated with one another to be stored as associated information. This associated information indicates that provided information identification information of provided information transmitted to a mobile terminal located within a range where a relative position (bearing) with respect to store B located at "north latitude: □□°□□'□□"", east longitude: XX°XX'XX""" is "equal to or more than 0° to less than 180°" and at a distance of less than 5 kilometers from an information source is "advertisement of company P, http://b-ten/ad/p.htm".

As shown in FIG. 8, an information name "store B", information source location information "north latitude: □□°□□'□□"", east longitude: XX°XX'XX""", a bearing range "equal to or more than 0° to less than 180°", a distance range "equal to or more than 5 kilometers", and provided information identification information "advertisement of company R, http://b-ten/ad/r.htm" are associated with one another to be stored as associated information. This associated information indicates that provided information identification information of provided information transmitted to a mobile terminal located within a range where a relative position (bearing) with respect to store B located at "north latitude: □□°□□'□□"", east longitude: XX°XX'XX""" is "equal to or more than 0° to less than 180°" and at a distance of equal to or more than 5 kilometers from an information source is "advertisement of company R, http://b-ten/ad/r.htm".

As shown in FIG. 8, an information name "store B", information source location information "north latitude: □□°□□'□□"", east longitude: XX°XX'XX""", a bearing range "equal to or more than 180° to less than 360°", a distance range "less than 5 kilometers", and provided information identification information "advertisement of company Q, http://b-ten/ad/q.htm" are associated with one another to be stored as associated information. This associated information indicates that provided information identification information of provided information transmitted to a mobile terminal located within a range where a relative position (bearing) with respect to store B located at "north latitude: □□°□□'□□"", east longitude: XX°XX'XX"" is "equal to or more than 180° to less than 360°" and at a distance of less than 5 kilometers from an information source is "advertisement of company Q, http://b-ten/ad/q.htm".

As shown in FIG. 8, an information name "store B", information source location information "north latitude: □□°□□'□□"", east longitude: XX°XX'XX"", a bearing range "equal to or more than 180° to less than 360°", a distance range "equal to or more than 5 kilometers", and provided information identification information "advertisement of company S, http://b-ten/ad/s.htm" are associated with one another to be stored as associated information. This associated information indicates that provided information identification information of provided information transmitted to a mobile terminal located within a range where a relative position (bearing) with respect to the store B located at "north latitude: □□°□□'□□"", east longitude: XX°XX'XX"" is "equal to or more than 180° to less than 360°" and at a distance that is equal to or more than 5 kilometers from an information source is "advertisement of company S, http://b-ten/ad/s.htm".

Associated information storage unit 120 can store, as the relative position information, a bearing of the location indicated by the terminal location information transmitted from mobile terminals 300-1 and 300-2 with respect to the location of the information source, and a height difference range between the information source and mobile terminals 300-1 and 300-2.

Associated information storage unit 120 shown in FIG. 2 stores, as shown in FIG. 11, information names, information source location information, bearing ranges, distance ranges, height difference ranges, and provided information identification information that are all associated with each other. The bearing range is relative position information indicating a relative position with respect to the location of an information source. The height difference range is information indicating a height difference between the information source and mobile terminals 300-1 and 300-2. In other words, the bearing range and the height difference range are stored as relative position information. A height difference is generally based on the number of floors of an information source, for example, a second floor or a third floor of store A, assuming that mobile terminals 300-1 and 300-1 are in a location corresponding to a first floor of the information source. In other words, provided information where a height difference range is associated with "less than 10 meters" is information of a floor located at an altitude of less than 10 meters.

For example, as shown in FIG. 11, an information name "store A", information source location information "north latitude: ○○°○○'○○"", east longitude: ΔΔ°ΔΔ'ΔΔ"", a bearing range "equal to or more than 90° to less than 270°", a height difference range "less than 10 meters", and provided information identification information "floor information of south building, http://a-ten/floor_s.htm" are associated with one another to be stored as associated information. This associated information indicates that provided information identification information of provided information transmitted to a mobile terminal located within a range where a relative position (bearing) with respect to store A located at "north latitude: ○○°○○'○○"", east longitude: ΔΔ°ΔΔ'ΔΔ"" is "equal to or more than 90° to less than 270°" and at a height difference of less than 10 meters from an information source is "floor information of south building, http://a-ten/floor_s.htm". As shown in FIG. 11, an information name "store A", information source location information "north latitude: ○○°○○'○○"", east longitude: ΔΔ°ΔΔ'ΔΔ"", a bearing range "equal to or more than 90° to less than 270°", a height difference range "equal to or more than 10 meters", and provided information identification information "event information, http://a-ten/event.htm" are associated with one another to be stored as associated information. This associated information indicates that provided information identification information of provided information transmitted to a mobile terminal located within a range where a relative position (bearing) with respect to store A located at "north latitude: ○○°○○'○○"", east longitude: ΔΔ°ΔΔ'ΔΔ"" is "equal to or more than 90° to less than 270°" and at a height difference that is equal to or more than 10 meters from an information source is "event information, http://a-ten/event.htm".

As shown in FIG. 11, an information name "store A", information source location information "north latitude: ○○°○○'○○"", east longitude: ΔΔ°ΔΔ'ΔΔ"", a bearing range "equal to or more than 0° to less than 90° or equal to or more than 270° to less than 360°", a height difference range "less than 10 meters", and provided information identification information "floor information of north building, http://a-ten/floor_n.htm" are associated with one another to be stored as associated information. This associated information indicates that provided information identification information of provided information transmitted to a mobile terminal located within a range where a relative position (bearing) with respect to store A located at "north latitude: ○○°○○'○○"", east longitude: ΔΔ°ΔΔ'ΔΔ"" is "equal to or more than 0° to less than 90° or equal to or more than 270° to less than 360°" and at a height difference of less than 10 meters from an information source is "floor information of north building, http://a-ten/floor_n.htm".

As shown in FIG. 11, an information name "store A", information source location information "north latitude: ○○°○○'○○"", east longitude: ΔΔ°ΔΔ'ΔΔ"", a bearing range "equal to or more than 0° to less than 90° or equal to or more than 270° to less than 360°", a height difference range "equal to or more than 10 meters", and provided information identification information "event information, http://a-ten/event.htm" are associated with one another to be stored as associated information. This associated information indicates that provided information identification information of provided information transmitted to a mobile terminal located within a range where a relative position (bearing) with respect to store A located at "north latitude: ○○°○○'○○"", east longitude: ΔΔ°ΔΔ'ΔΔ"" is "equal to or more than 0° to less than 90° or equal to or more than 270° to less than 360°" and at a height difference that is equal to or more than 10 meters from an information source is "event information, http://a-ten/event.htm".

As shown in FIG. 11, an information name "store B", information source location information "north latitude: □□°□□'□□"", east longitude: XX°XX'XX"", a bearing range "equal to or more than 0° to less than 180°", a height difference range "less than 10 meters", and provided information identification information "advertisement of company P, http://b-ten/ad/p.htm" are associated with one another to be stored as associated information. This associated information indicates that provided information identification information of provided information transmitted to a mobile terminal located within a range where a relative position (bearing) with respect to store B located at "north latitude: □□°□□'□□"", east longitude: XX°XX'XX"" is "equal to or more than 0° to less than 180°" and at a height difference of less than 10 meters from an information source is "advertisement of company P, http://b-ten/ad/p.htm".

As shown in FIG. 11, an information name "store B", information source location information "north latitude: □□°□□'□□"", east longitude: XX°XX'XX"", a bearing range "equal to or more than 0° to less than 180°", a height difference range "equal to or more than 10 meters", and provided information identification information "advertisement of company T, http://b-ten/ad/t.htm" are associated with one another to be stored as associated information. This associated information indicates that provided information identification information of provided information transmitted to a mobile terminal located within a range where a relative position (bearing) with respect to store B located at "north latitude: □□°□□'□□"", east longitude: XX°XX'XX"" is "equal to or more than 0° to less than 180°" and at a height difference that is equal to or more than 10 meters from an information source is "advertisement of company T, http://b-tenlad/t.htm".

As shown in FIG. 11, an information name "store B", information source location information "north latitude: □□°□□'□□"", east longitude: XX°XX'XX"", a bearing range "equal to or more than 180° to less than 360°", a height difference range "less than 10 meters", and provided information identification information "advertisement of company Q, http://b-ten/ad/q.htm" are associated with one another to be stored as associated information. This associated information indicates that provided information identification information of provided information transmitted to a mobile terminal located within a range where a relative position (bearing) with respect to store B located at "north latitude: □□°□□'□□"", east longitude: XX°XX'XX"" is "equal to or more than 180° to less than 360°" and at a height difference of less than 10 meters from an information source is "advertisement of company Q, http://b-ten/ad/q.htm".

As shown in FIG. 11, an information name "store B", information source location information "north latitude: □□°□□'□□"", east longitude: XX°XX'XX"", a bearing range "equal to or more than 180° to less than 360°", a height difference range "equal to or more than 10 meters", and provided information identification information "advertisement of company U, http://b-ten/ad/u.htm" are associated with one another to be stored as associated information. This associated information indicates that provided information identification information of provided information transmitted to a mobile terminal located within a range where a relative position (bearing) with respect to store B located at "north latitude: □□°□□'□□"", east longitude: XX°XX'XX"" is "equal to or more than 180° to less than 360°" and at a height difference that is equal to or more than 10 meters from an information source is "advertisement of company U, http://b-ten/ad/u.htm".

Relative position calculation unit 130 calculates, after receipt of the terminal location information from mobile terminals 300-1 and 300-2, a relative position based on the received terminal location information and information source location information. Any method can be used for this calculation as long as the method can calculate a bearing or a distance which becomes a relative position of the mobile terminal with respect to the information source as described above. For example, a method that calculates a bearing or a distance based on a latitude and a longitude indicated by the terminal location information or a latitude and a longitude indicated by the information source location information can be employed. When a bearing is calculated based on a latitude and a longitude, a method can be employed, which calculates a difference between coordinates indicated by the terminal location information and coordinates indicated by the information source location information, an X coordinate indicating a longitude and a Y coordinate indicating a latitude, and calculates an angle (bearing) based on the calculated difference.

Relative position calculation unit 130 calculates, after receipt of direction information from mobile terminals 300-1 and 300-2 which include the electronic compasses, a relative position based on the direction information and the information source location information. For example, when the direction information indicates "south", mobile terminals 300-1 and 300-2 are located north of the information source, and hence the relative position is "north".

Relative position calculation unit 130 outputs relative position information indicating the calculated relative position to search unit 140.

Search unit 140 searches, based on the relative position information output from relative position calculation unit 130, for provided information identification information in associated information storage unit 120. In this case, if an information name has been received from mobile terminals 300-1 and 300-2, the information name is used as a keyword for searching. For example, when an information name "store A" is transmitted from mobile terminals 300-1 and 300-2, the relative position information output from relative position calculation unit 130 is "180°", and the associated information shown in FIG. 3 has been stored in associated information storage unit 120, search unit 140 searches for provided information identification information "floor information of south building, http://a-ten/floor_s.htm" stored in association with the information name "store A" and a beating range "equal to or more than 90° to less than 270°". Search unit 140 outputs the retrieved provided information identification unit to acquisition unit 150.

All or some of the components included in information providing server 100 shown in FIG. 2 can be disposed in mobile terminals 300-1 and 300-2. For example, relative position calculation unit 130 and search unit 140 can be installed in mobile terminals 300-1 and 300-2. In this case, mobile terminals 300-1 and 300-2 can be configured to acquire a location of the information source from information providing server 100, calculate a relative position based on locations of mobile terminals 300-1 and 300-2 and the location of the information source acquired from information providing server 100, and search for provided information identification information from information providing server 100 based on the calculated relative position.

Acquisition unit 150 acquires provided information to which the provided information identification information output from search unit 140 has been added from provided information database 200. There are no particular restrictions on the acquisition method. For example, when storage area information of a Uniform Resource Location (URL) or the like which has stored the provided information is provided information identification information as described above, acquisition unit 150 acquires the provided information by accessing a storage area indicated by the storage area information. Acquisition unit 150 outputs the provided information acquired from provided information database 200 to communication unit 160.

Communication unit 160 is a network interface unit for communicating with mobile terminals 300-1 and 300-2 via network 400. For example, communication unit 160 transmits the provided information output from acquisition unit 150 to mobile terminals 300-1 and 300-2 via network 400. Communication unit 160 reads the abovementioned menu information (including a plurality of information names) from menu storage unit 110, and transmits the menu information to mobile terminals 300-1 and 300-2 via network 400.

Figure 12:
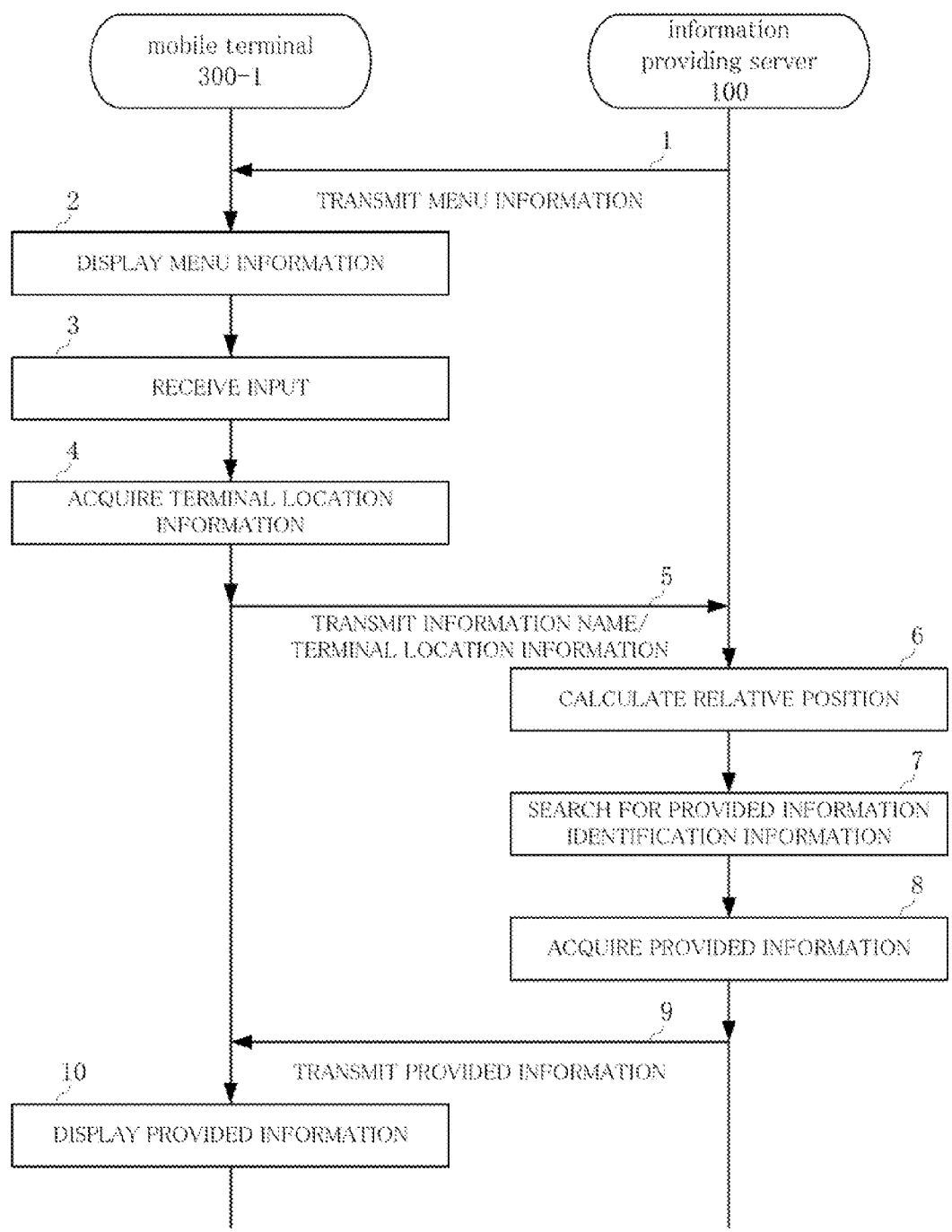
FIG. 12 is a sequence diagram illustrating an information providing method according to the embodiment.

Hereinafter, referring to FIG. 12, an information providing method according to the embodiment is described. The information providing method is described by taking an example of transmission of provided information to mobile terminal 300-1.

First, in step 1, communication unit 160 of information providing server 100 reads the menu information from menu storage unit 110, and transmits the read menu information to mobile terminal 300-1 via network 400. The processing of step 1 can be performed in response to receipt of a predetermined signal from mobile terminal 300-1. For example, when a search request including a keyword is input to mobile terminal 300-1, the search request is transmitted from mobile terminal 300-1 to information providing server 100. Information providing server 100 that has received the search request extracts a pertinent information source from a keyword group (not shown) associated with an information name or an information source based on the received keyword, generates menu information which is an extraction result listing extracted information sources, and performs the processing of step 1.

In step 2, mobile terminal 300-1 displays the menu information received from information providing server 100.

The process is described by taking an example where information names contained in the menu information are "store A" and "store B".

Figure 13:
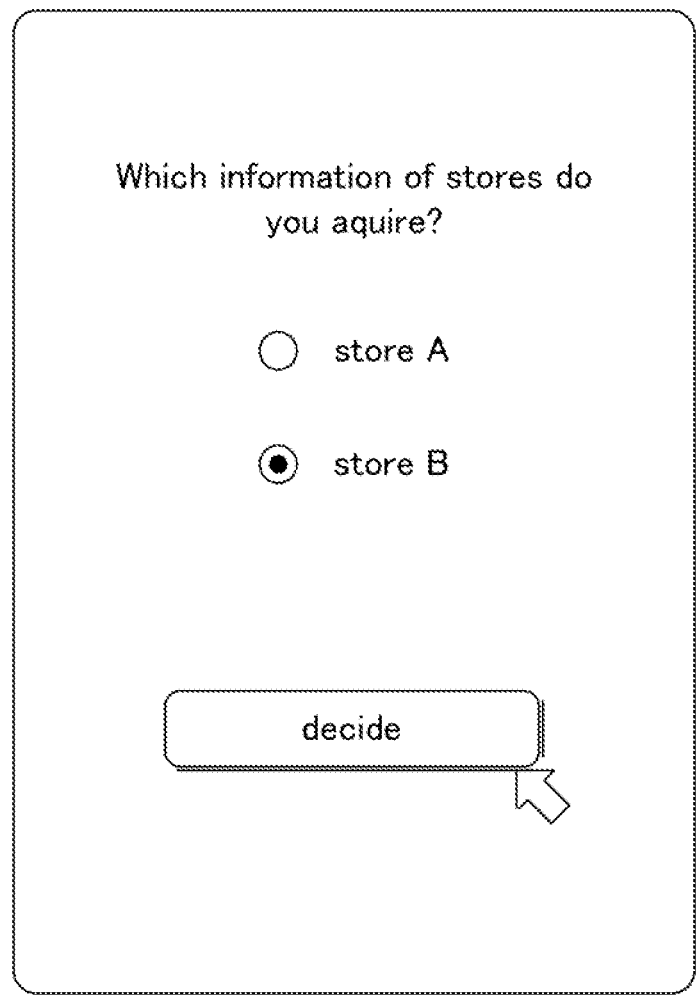
FIG. 13 shows an example of menu information displayed on the mobile terminal in step 2.

As shown in FIG. 13, a screen for enabling an operator of mobile terminal 300-1 to select one store from among "store A" and "store B" as an information source is displayed. Both displays of the "store A" and the "store B" include radio buttons. After selection of one of the radio buttons, decide is selected, thereby determining an information source.

In step 3, an input of necessary information (input of information name) is received according to the menu information displayed in step 2. Then, in step 4, mobile terminal 300-1 acquires terminal location information indicating a current location of mobile terminal 300-1. There are no particular restrictions on the acquisition method of the terminal location information.

After the acquisition of the terminal location information, in step 5, mobile terminal 300-1 transmits the information name and the terminal location information to information providing server 100 via network 400.

After the transmission of the information name and the terminal location information from mobile terminal 300-1 to information providing server 100 via network 400, in step 6, based on the received information name and the received terminal location information, relative position calculation unit 130 calculates a relative position of mobile terminal 300-1 with respect to the information source to which the information name has been added. Specifically, relative position calculation unit 130 reads information source location information from associated information storage unit 120 based on the information name received from mobile terminal 300-1, and calculates a relative position based on the read information source location information and the terminal location information received from mobile terminal 300-1.

In step 7, based on relative position information indicating the calculated relative position, search unit 140 searches for provided information identification information in associated information storage unit 120.

In step 8, based on the retrieved provided information identification information, acquisition unit 150 acquires the provided information from provided information database 200.

In step 9, communication unit 160 transmits the acquired provided information to mobile terminal 300-1 via network 400.

In step 10, mobile terminal 300-1 displays the provided information received from information providing server 100.

The process is described by taking an example where provided information is floor information of a south building of store A.

Figure 14:
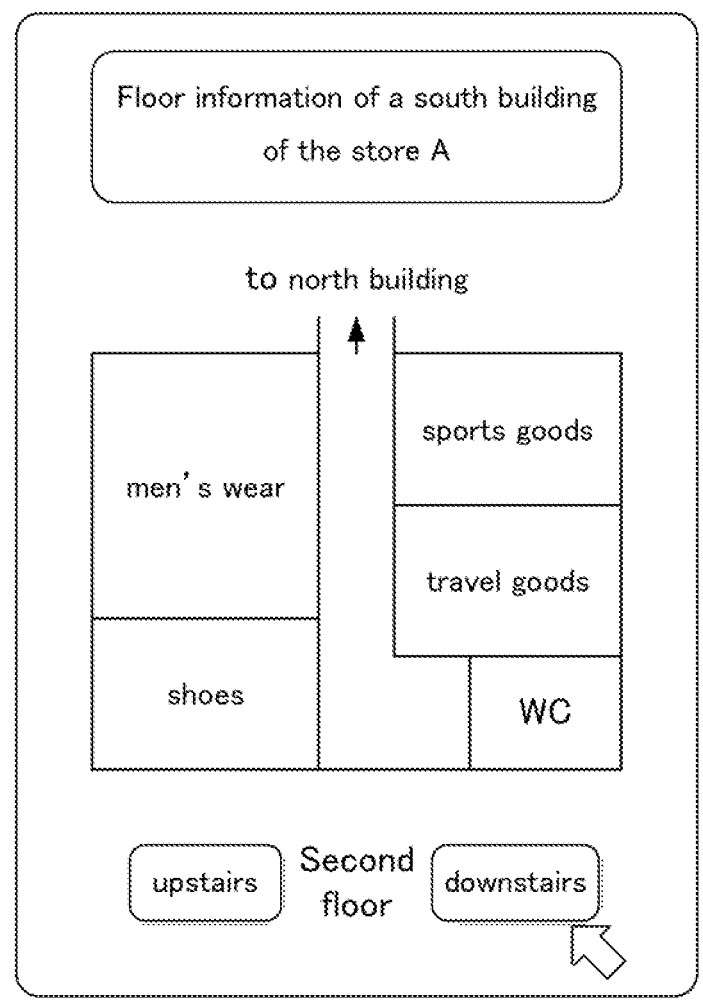
FIG. 14 shows an example of provided information displayed on the mobile terminal in step 10.

As shown in FIG. 14, the floor information of the south building which is the provided information transmitted to mobile terminal 300-1 is displayed. In the south building of store A, a department store including men's wear, shoes, sports goods, and travel goods is displayed as a map.

As floor information of the south building of store A, when not only the floor map shown in FIG. 14 but also various pieces of information of the south building are received as provided information, such information can be displayed.

An example where the provided information is information of the south building of the store A is described.

Figure 15:
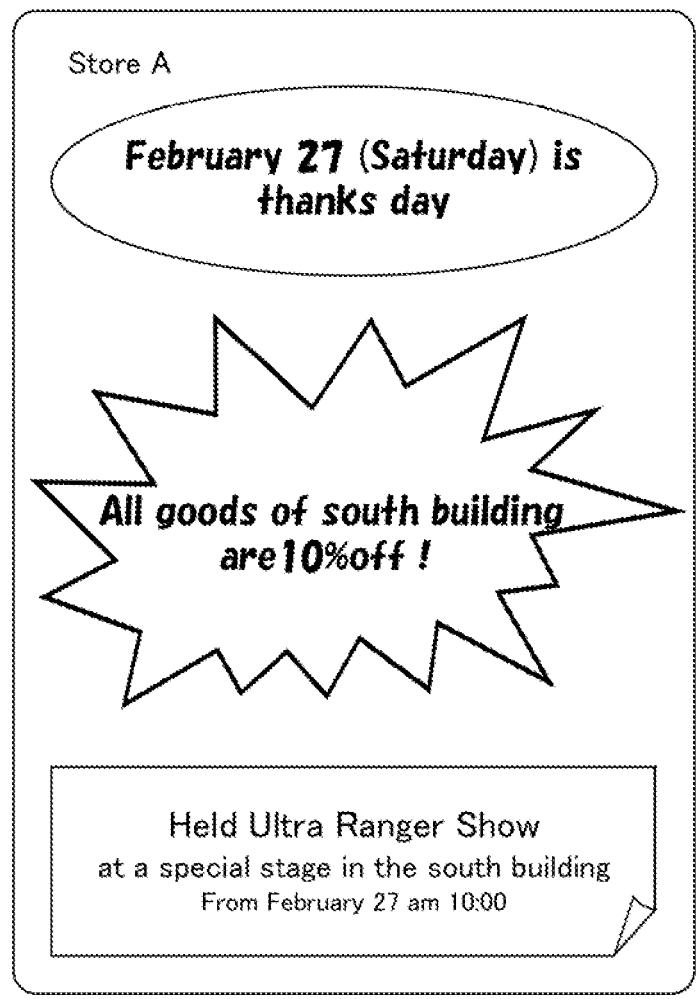
FIG. 15 shows another example of provided information displayed on the mobile terminal in step 10.

As shown in FIG. 15, the information of the south building of the store A is displayed on mobile terminal 300-1. In FIG. 15, discount information on commodities sold in the south building of store A or information on shows held at a special stage in the south building is displayed. Not only this information but also corporate information of store A can be displayed.

As described above, in the case of the information of the information source closer to the mobile terminal, in other words, when the relative position of the mobile terminal with respect to the information source is on a south side, information on the south side of the information source is provided. When the relative position of the mobile terminal with respect to the information source is on a north side, information on the north side of the information source is provided. However, the present invention provides information according to the relative position of the mobile terminal with respect to the information source. Thus, needless to say, information on a reverse side can be provided. Hereinafter, a specific example is described.

Figure 16:
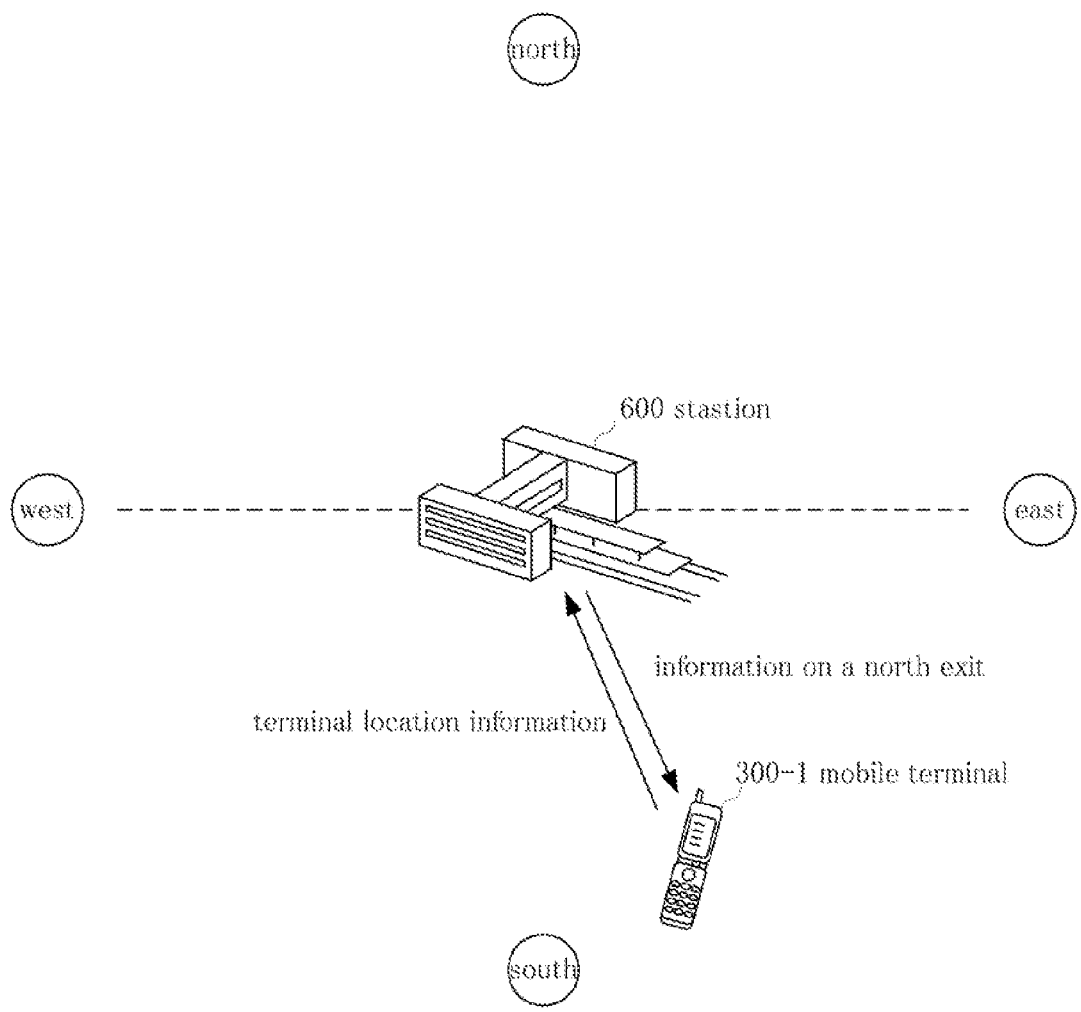
FIG. 16 is a diagram illustrating an operation when information of a side opposite a relative position of the mobile terminal to an information source is transmitted.

As shown in FIG. 16, when mobile terminal 300-1 is located south with respect to station 600 which is an information source, information on a north exit which is a backside of station 600 is transmitted to mobile terminal 300-1. Thus, by transmitting information on the reverse side, information on a place not visible but invisible to the owner of mobile terminal 300-1 can be provided.

Among bearing ranges (equal to or more than 0° to less, than 360°) of mobile terminals 300-1 and 300-2 with respect to the information source, only some bearing ranges (e.g., only those equal to more than 90° to less than 270°) can be associated with the provided information identification information to be stored. In this case, before the menu information is transmitted from information providing server 100 to mobile terminals 300-1 and 300-2, the terminal location information of mobile terminals 300-1 and 300-2 is transmitted from mobile terminals 300-1 and 300-2 to information providing server 100. Menu information which is composed of only an information source which a relative position calculated based on the terminal location information received from mobile terminals 300-1 and 300-2 and information source location information of each of all the information sources is included only an information source with some bearing ranges described above can be generated by information providing server 100, and transmitted from information providing server 100 to mobile terminals 300-1 and 300-2.

Thus, the present invention can provide information suited to a situation of the viewer.

Processing executed by each component included in information providing server 100 can be performed by a logical circuit manufactured according to a purpose. A program that describes processing contents as a procedure can be recorded in a recording medium readable by information providing server 100. The program recorded in the recording medium can be read to be executed by information providing server 100. The recording medium readable by information providing server 100 is a relocatable recording medium such as a floppy (registered trademark) disk, a magneto-optical disk, a Digital Versatile Disc (DVD), or a Compact Disk (CD), a memory such as a Read-Only Memory (ROM) or a Random Access Memory (RAM), or a Hard Disk Drive (HDD) incorporated in information providing server 100. The program recorded in the recording medium is read by a Central Processing Unit (CPU, not shown) disposed in information providing server 100, and processed in the same manner as that described above under control of the CPU. The CPU operates as a computer to execute the program read from the recording medium which has recorded the program.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

The invention claimed is:

1. An information providing system comprising:
    a provided information database for storing a plurality of pieces of provided information;
    a mobile terminal; and
    an information providing server for transmitting the provided information to the mobile terminal,
    wherein the information providing server associates information source location information indicating a location of an information source which is a base of the provided information, bearing information indicating a bearing of a location of the mobile terminal with respect to the location of the information source, and provided information identification information added to each of the plurality of pieces of provided information to identify the plurality of pieces of provided information with one another, and then stores the information as associated information;
    the mobile terminal transmits terminal location information indicating the location of the mobile terminal, to the information providing server;
    the information providing server calculates, when the terminal location information is received from the mobile terminal, the bearing of the location of the mobile terminal with respect to the location of the information source based on the terminal location information and the information source location information, searches for the provided identification information in the associated information based on the bearing information indicating the calculated bearing, and acquires the provided information to which the provided information identification information, which has been retrieved, has been added from the plurality of pieces of provided information stored in the provided information database, and transmits the acquired provided information to the mobile terminal; and
    the mobile terminal displays the provided information received from the information providing server.

2. The information providing system according to claim 1, wherein the information providing server stores the information expressing the bearing comprising at least one of a north, south, east and west direction, in a range of an angle around the information source as the bearing information.

3. The information providing system according to claim 1, wherein the information providing server associates the bearing information and distance information indicating the distance from the information source to the mobile terminal, and then stores the information as associated information, calculates, when the terminal location information is received from the mobile terminal, the distance from the information source to the mobile terminal based on the terminal location information and the information source location information, searches for the provided information identification information in the associated information based on the distance information indicating the calculated distance and the bearing information indicating the calculated bearing.

4. The information providing system according to claim 1, wherein the information providing server associates the bearing information and height difference information indicating the height difference from the information source to the mobile terminal, and then stores the information as associated information, calculates, when the terminal location information is received from the mobile terminal, the height difference from the information source to the mobile terminal based on the terminal location information and the information source location information, searches for the provided information identification information in the associated information based on the height difference information indicating the calculated height difference and the bearing information indicating the calculated bearing.

5. The information providing system according to claim 1, wherein the mobile terminal transmits, when one information name is selected from a plurality of information names indicating a plurality of information sources received from the information providing server, the selected information name together with the terminal location information to the information providing server; and
    the information providing server transmits the plurality of information names to the mobile terminal, and acquires, according to the bearing of the location of the mobile terminal with respect to the location of the information source corresponding to the information name received from the mobile terminal, the preset provided information from the plurality of pieces of provided information stored in the provided information database.

6. An information providing server connected to a provided information database for storing a plurality of pieces of provided information and configured to transmit the provided information to a mobile terminal, comprising:
    an associated information storage unit that associates information source location information indicating a location of an information source which is a base of the provided information, bearing information indicating a bearing of a location of the mobile terminal with respect to the location of the information source, and provided information identification information added to each of the plurality of pieces of provided information to identify the plurality of pieces of provided information that are associated with one another, and then stores the information;

a relative position calculation unit that calculates, when the terminal location information indicating a location of the mobile terminal is received from the mobile terminal, the bearing of the location of the mobile terminal with respect to the location of the information source based on the terminal location information and the information source location information;

a search unit that searches for the provided information identification information in the associated information storage unit based on the bearing information indicating the bearing calculated by the relative position calculation unit;

an acquisition unit that acquires the provided information to which the provided information identification information retrieved by the search unit has been added from the plurality of pieces of the provided information stored in the provided information database; and a communication unit that transmits the provided information acquired by the acquisition unit to the mobile terminal.

7. The information providing server according to claim 6, wherein the associated information storage unit stores the information expressing the bearing comprising at least one of a north, south, east and west direction, in a range of an angle around the information source as the bearing information.

8. The information providing server according to claim 6, wherein the associated information storage unit associates bearing the information and distance information indicating the distance from the information source to the mobile terminal, and then stores the information;

the relative position calculation unit calculates, when the terminal location information is received from the mobile terminal, the distance from the information source to the mobile terminal based on the terminal location information and the information source location information; and the search unit searches for the provided information identification information in the associated information storage unit based on the distance information indicating the distance calculated by the relative position calculation unit and the bearing information indicating the bearing calculated by the relative position calculation unit.

9. The information providing server according to claim 6, wherein the associated information storage unit associates the bearing information and height difference information indicating the height difference from the information source to the mobile terminal, and then stores the information;

the relative position calculation unit calculates, when the terminal location information is received from the mobile terminal, the height difference from the information source to the mobile terminal based on the terminal location information and the information source location information; and the search unit searches for the provided information identification information in the associated information storage unit based on the height difference information indicating the height difference calculated by the relative position calculation unit and the bearing information indicating the bearing calculated by the relative position calculation unit.

10. The information providing server according to claim 6, wherein the associated information storage unit associates, for each of a plurality of information sources, a plurality of information names indicating the plurality of information sources, the information source location information, the bearing information, and the provided information identification information that are associated with one another, and then stores the information;

the communication unit transmits the plurality of information names to the mobile terminal; and the search unit searches for the provided information identification information in the associated information storage unit based on the bearing information and an information name received from the mobile terminal among the plurality of information names.

11. An information providing method for transmitting provided information to a mobile terminal, comprising:

a step of calculating, when terminal location information indicating a location of the mobile terminal is received from the mobile terminal, a bearing of the location of the mobile terminal with respect to the location of an information source which is a base of the provided information based on the terminal location information and the information source location information indicating the location of the information source;

a step of searching for, based on bearing information indicating the calculated bearing, provided information identification information in associated information associating the bearing information and the provided information identification information added to the provided information to identify the provided information beforehand;

a step of acquiring the provided information to which the provided information identification information, which has been retrieved, has been added from a provided information database for storing the provided information; and a step of transmitting the acquired provided information to the mobile terminal.

12. The information providing method according to claim 11, wherein the bearing information is the information which expresses the bearing comprising at least one of a north, south, east and west direction, in a range of an angle around the information source.

13. The information providing method according to claim 11, wherein the associated information is the information which associates the bearing information, the provided information identification information and distance information indicating the distance from the information source to the mobile terminal, and the method further comprises:

a step of calculating, when the terminal location information is received from the mobile terminal, the distance from the information source to the mobile terminal based on the terminal location information and the information source location information; and a step of searching for the provided information identification information in the associated information based on the distance information indicating the calculated distance and the bearing information indicating the calculated bearing.

14. The information providing method according to claim 11, wherein the associated information is the information which associates the bearing information, the provided information identification information and height difference information indicating the height difference from the information source to the mobile terminal, and the method further comprises:

a step of calculating, when the terminal location information is received from the mobile terminal, the height difference from the information source to the mobile terminal based on the terminal location information and the information source location information; and a step of searching for the provided information identification information in the associated information based on the height difference information indicating the calculated height difference and the bearing information indicating the calculated bearing.

15. A non-transitory recording medium for storing a program which, when executed by an information providing server for transmitting provided information to a mobile terminal, causes the information providing server to execute a method comprising:

a step of calculating, when terminal location information indicating a location of the mobile terminal is received from the mobile terminal, a relative position bearing of the location of the mobile terminal with respect to the location of an information source which is base of the provided information based on the terminal location information and the information source location information indicating the location of the information source;

a step of searching for, based on relative position bearing information indicating the calculated relative position bearing, provided information identification information in associated information associating the relative position bearing information and the provided information identification information added to the provided information to identify the provided information beforehand;

a step of acquiring the provided information to which the provided information identification information, which has been retrieved, has been added from a provided information database for storing the provided information; and a step of transmitting the acquired provided information to the mobile terminal.

16. The non-transitory recording medium according to claim 15, wherein the bearing information is the information which expresses the bearing comprising at least one of a north, south, east and west direction, in a range of an angle around the information source.

17. The non-transitory recording medium according to claim 15, wherein the associated information is the information which associates the bearing information, the provided information identification information and distance information indicating the distance from the information source to the mobile terminal, and the method further comprises:

a step of calculating, when the terminal location information is received from the mobile terminal, the distance from the information source to the mobile terminal based on the terminal location information and the information source location information; and a step of searching for the provided information identification information in the associated information based on the distance information indicating the calculated distance and the bearing information indicating the calculated bearing.

18. The non-transitory recording medium according to claim 15, wherein the associated information is the information which associates the bearing information, the provided information identification information and height difference information indicating the height difference information from the information source to the mobile terminal, and the method further comprises:

a step of calculating, when the terminal location information is received from the mobile terminal, the height difference from the information source to the mobile terminal based on the terminal location information and the information source location information; and a step of searching for the provided information identification information in the associated information based on the height difference information indicating the calculated height difference and the bearing information indicating the calculated bearing.

* * * * *